United States Patent [19]

Broekhof et al.

[11] Patent Number: 4,843,061

[45] Date of Patent: Jun. 27, 1989

[54] CYCLOHEXANE-, CYCLOHEXENE- AND CYCLOHEXADIENE-, BICYCLO (2.2.1)-HEPTENECARBOXYLIC ACID ESTERS, AND ALSO PERFUME COMPOSITIONS AND PERFUMED PRODUCTS WHICH CONTAIN ONE OR MORE OF SAID COMPOUNDS AS PERFUME COMPONENT

[75] Inventors: Nicolaas L. J. M. Broekhof, Naarden; Jan G. Witteveen; Antonius J. A. van der Weerdt, both of Huizen, all of Netherlands

[73] Assignee: Naarden International N.V., The Hague, Netherlands

[21] Appl. No.: 59,914

[22] Filed: Jun. 9, 1987

[30] Foreign Application Priority Data

Jun. 13, 1986 [NL] Netherlands .......................... 8601541

[51] Int. Cl.⁴ ...................... C11B 9/00; C07C 69/753
[52] U.S. Cl. ...................................... 512/22; 560/120; 560/128
[58] Field of Search ...................... 512/22, 24; 560/128

[56] References Cited

U.S. PATENT DOCUMENTS 4,113,663 9/1978 Schenk .................................. 560/128
4,144,199 3/1979 Wille et al. ............................ 512/24
4,277,618 7/1981 Helmlinger et al. .................. 512/22
4,399,036 3/1982 Klemarczyk et al. ............... 560/120

FOREIGN PATENT DOCUMENTS 7605914 12/1976 Netherlands .......................... 512/22

OTHER PUBLICATIONS

Varech et al., "Chemical Abstracts", vol. 92 (1980) 163455r.
Eisenbarth et al., "Chemical Abstracts", vol. 98(7) (1983) 53209e.

*Primary Examiner*—Werren B. Lone
*Attorney, Agent, or Firm*—Brumbaugh, Graves, Donohue & Raymond

[57] ABSTRACT

Perfume compositions containing at least one compound having the formula 1

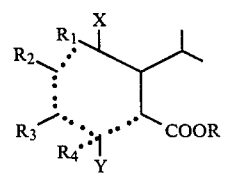

wherein said compounds have the substituents as defined in claim 1. Perfumed compositions and perfumed products containing them are characterized by flowery, fruity, green and spicy odors, sometimes accompanied by a slight minty nuance with animal and/or wood notes in the after-odor.

13 Claims, No Drawings

CYCLOHEXANE-, CYCLOHEXENE- AND CYCLOHEXADIENE-, BICYCLO (2.2.1)-HEPTENECARBOXYLIC ACID ESTERS, AND ALSO PERFUME COMPOSITIONS AND PERFUMED PRODUCTS WHICH CONTAIN ONE OR MORE OF SAID COMPOUNDS AS PERFUME COMPONENT

The invention relates to isopropyl-substituted cyclohexane-, cyclohexene-, cyclohexadiene-, bicyclo[2.2.1]heptane- and bicyclo[2.2.1]heptenecarboxylic acid esters, to perfume compositions which contain one or more of said compounds as perfume component, and also to products perfumed with said compounds or compositions containing said compounds.

There is a continuing interest in the use of synthetic fragrances in perfumes and products to be perfumed such as cosmetics, soaps, detergents, household products, etc. This interest is stimulated by the inadequate quantity and the varying quality of natural fragrances.

Surprisingly, it has now been found that esters of isopropyl-substituted cyclohexane-, cyclohexene-, cyclohexadiene-, bicyclo[2.2.1]heptane-, and bicyclo[2.2.1]heptenecarboxylic acids having a structure according to the general formula 1

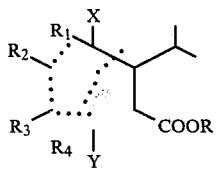

wherein
X and Y each represent a hydrogen atom or X and Y together represents a methylene bridge,
R represents an alkyl, alkenyl or cycloalkyl group containing 1-6 carbon atoms, and
$R_1$–$R_4$ each represent a hydrogen atom or a methyl group, with the proviso that
  if X and Y each represent a hydrogen atom, the following cases apply:
    if $R_1$ represents a methyl group, $R_4$ represents a methyl group and $R_2$ and $R_3$ represent a hydrogen atom;
    if $R_3$ represents a methyl group, $R_1$ and $R_4$ both represent a hydrogen atom; and
    if neither $R_1$ nor $R_3$ represents a methyl group, $R_2$ and $R_4$ both represent, or one of the two represents, or neither of the two represents, a methyl group; and
  if X and Y together represent a methylene bridge, at most one of the symbols $R_1$–$R_4$ represents a methyl group;
the double dotted line represents a single or a double bond, in which case
  if X and Y and also $R_1$–$R_3$ represent a hydrogen atom and $R_4$ represents a methyl group, the double dotted line together with a single dotted line, or two single dotted lines, may together represent a pair of conjugated double bonds, and
  if X and Y and also $R_1$–$R_3$ represent a hydrogen atom, $R_4$ may also represent a methylene group, in which case the double dotted line together with the dotted line directed towards $R_4$ represent a pair of conjugated double bonds, are valuable fragrances with a powerful odour which persists for a long time.

The fragrances according to the invention are characterized by flowery, fruity, green and spicy odours, sometimes accompanied by a slight minty nuance, with animal and/or woody notes in the after-odour. The preference is for the compounds in which either X and Y together form a methylene bridge, or X, Y, $R_1$ and $R_3$ are all a hydrogen atom, $R_4$ is a methyl group and $R_2$ represents a hydrogen atom or a methyl group. More particularly, the preference is for compounds in which R is an alkyl group containing 1-3 carbon atoms.

Various alkyl esters of substituted cyclohexene- and cyclohexadienecarboxylic acids are known as fragrances. By far the majority of said compounds are characterized by the α,α, α'-trimethyl substitution pattern known from, inter alia, saffronic and geranic acid.

Esters of the last-named acids are described, inter alia, in the U.S. Pat. No. 4,144,199 and the European Patent Application No. 56,109, while related esters are described in the European Patent Application No. 21,100. Similar esters in which one of the three methyl groups is replaced by an ethyl group are described in the U.S. Pat. Nos. 4,144,199 and 4,113,663. From the abovementioned publications it emerges that the odours of said compounds sometimes exhibit similarities to each other, but are also very different in many cases. This is in agreement with the empirical fact that even small differences in chemical structure may result in large and unpredictable differences in olfactory properties.

None of the abovementioned publications, however, reports anything relating to isopropyl-substituted cyclohexane-, cyclohexene- or cyclohexadienecarboxylic acid esters such as the compounds according to the present invention.

Esters of some bicyclo[2.2.1]heptane- and heptenecarboxylic acids are also known as fragrances. Thus, the U.S. Pat. No. 4,319,036 reports that certain methyl- and dimethyl-substituted bicyclo[2.2.1]heptane- and heptenecarboxylic alkyl esters can be used as fragrances and flavourings. Esters of other methyl- and dimethylbicyclo[2.2.1]heptane- and heptenecarboxylic acids are described in the European Pat. No. 40,894 as fragrances with a strong odour reminiscent of coniferous wood. However, neither of the two publications reports anything relating to isopropyl-substituted bicycloheptane- or heptenecarboxylic acid esters such as the compounds according to the present invention.

The Dutch Patent Application No. 76.05914 describes the fact that monoesters derived from methyl-, dimethyl- and isopropylbicyclo[2.2.1]heptane- and heptenecarboxylic acids and alkylene- or dialkylene glycols have a physiological cooling effect when they are brought into contact with internal or external surface tissues of the body (skin, mucous membranes). Said application, however, does not report anything relating to the odour or to possible fragrance properties of said compounds.

The compounds according to the invention can be prepared by methods known per se for such compounds, for example by a Diels-Alder reaction of butadiene, isoprene, 1,3-pentadiene, 2,4-hexadiene, 2-methyl-1,3-pentadiene, 2,3-dimethylbutadiene, cyclopentadiene or methylcyclopentadiene with 4-methyl-2-pentenoic acid or esters derived therefrom as dienophile. The products obtained from the acid can then be esterified in the usual manner. If trans-4-methyl-pentenoic acid or an ester derived therefrom is used as dienophile in the Diels-Alder reaction, as is indicated by way of example for the dienes 1,3-pentadiene and 2-methyl-1,3-pentadiene in Reaction Scheme I, for cyclopentadiene in Reaction Scheme II and for methylcyclopentadiene in Reaction Scheme III, the isomers are then formed in which the isopropyl group and the ester group are situated in the trans-configuration with respect to each other on the ring system. Said isomers are indicated in Reaction Scheme I by cis-trans and trans-trans, depending on the position of the methyl group. In Reaction Scheme II, the two isomers are indicated by endo and exo, depending on the position of the isopropyl group The hydrogenation can be carried out in the usual manner by means of $H_2$ under the influence of known hydrogenation catalysts.

The bromination and dehydrobromination shown in Reaction Scheme I can be carried out by methods known per se; the bromination by means of N-bromosuccinimide or a similar brominating agent, the dehydrobromination under the influence of a base. In this case, a mixture of the isomers 1c, 1d and 1e is formed which, for the most part, consists of compound 1c (Reaction Scheme I). Here, too, no further separation of the isomers is necessary for application as a fragrance.

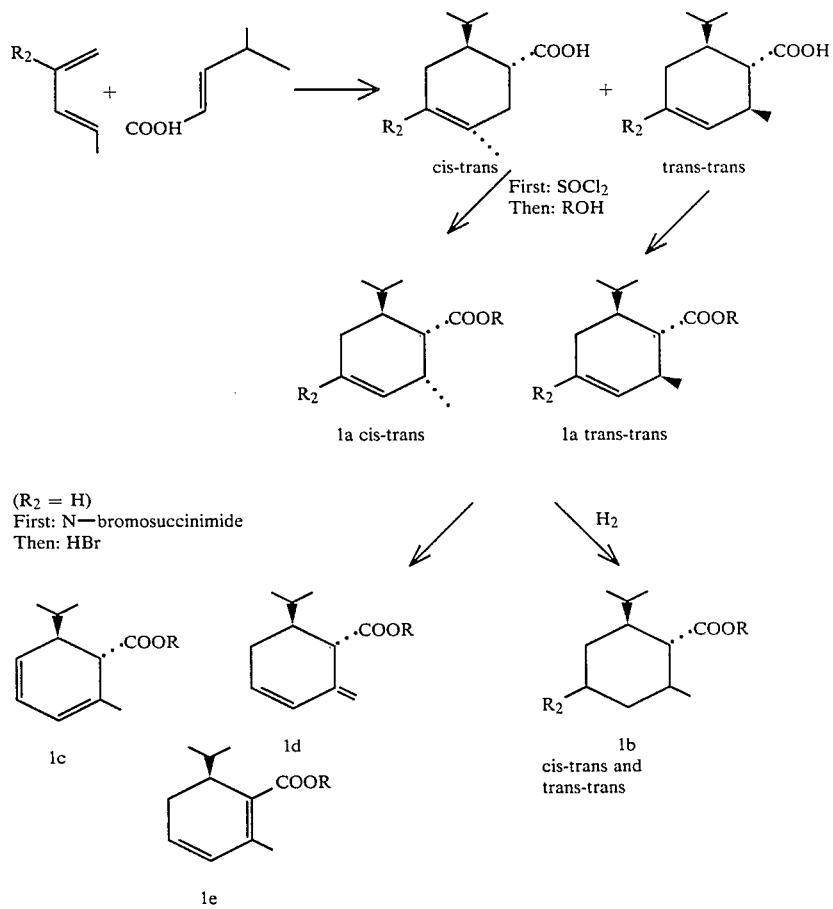

and the ester group with respect to the methylene bridge. In the reaction shown in Reaction Scheme III, the starting point is a mixture of two methylcyclopentadienes. The reaction product is a mixture of isomers in which the methyl group takes up one of the four positions indicated by arrows. For each of these isomeric structures, however, it is again true that, as in Reaction Scheme II, it exists as an endo and an exo isomer. The mixtures of isomers described above may be separated partially and in some cases even completely by common separation techniques. This is not necessary, however, for application as a fragrance and the mixtures obtained can be used as such. The same applies to the use of said mixtures as starting substances for the former reactions shown in Reaction Scheme I, II and III.

Reaction Scheme II

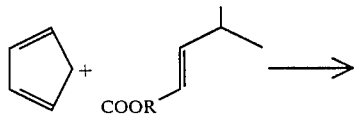

-continued

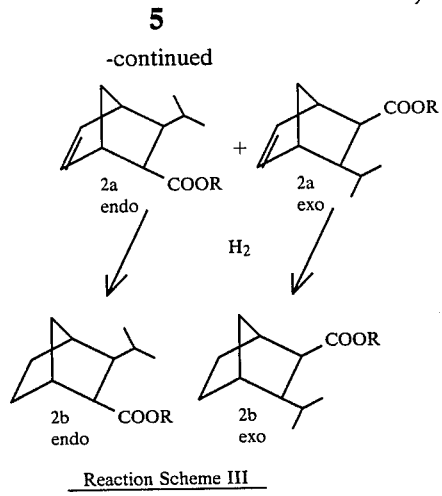

Reaction Scheme III

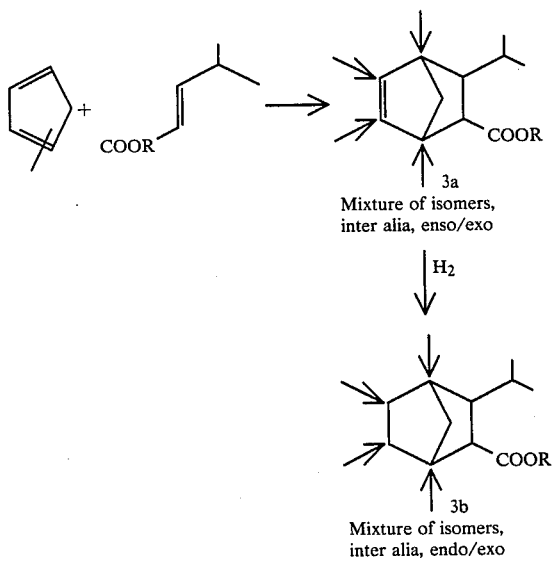

As already mentioned, the compounds according to the invention are valuable fragrances. In particular, the compounds 1a (Reaction Scheme I) and 2a (Reaction Scheme II) in which R is an alkyl group containing 1–3 carbon atoms are notable for a powerful odour which persists for a long time. These last-named compounds are new.

The term "perfume composition" is in this case understood to mean a mixture of fragrances and optionally auxiliary substances, if desired dissolved in a suitable solvent or mixed with a pulverulant substrate, which mixture is used to impart a desired odour to the skin and/or products of all kinds. Examples of such products are: soaps, detergents, air fresheners, room sprays, pomanders, candles, cosmetics such as creams, ointments, toilet waters, pre- and aftershave lotions, talcum powders, hair-care agents, body deodorants and antiperspirants.

Fragrances and fragrance mixtures which can be used in combination with the compounds according to the invention for the preparation of perfume compositions are, for example: natural products such as essential oils, absolutes, resinoids, resins, concretes etc., but also synthetic fragrances such as hydrocarbons, alcohols, aldehydes, ketones, ethers, acids, esters, acetals, ketals, nitriles etc., including saturated and unsaturated compounds, aliphatic, carbocyclic and heterocyclic compounds. Examples of fragrances which may be used in combination with the compounds according to the invention are: geraniol, geranyl acetate, linalool, linalyl acetate, tetrahydrolinalool, citronellol, citronellyl acetate, dihydromyrcenol, dihydromyrcenyl acetate, tetrahydromyrcenol, terpineol, terpinyl acetate, nopol, nopyl acetate, 2-phenylethanol, 2-phenylethyl acetate, benzyl alcohol, benzyl acetate, benzyl salicylate, benzyl benzoate, styrallyl acetate, amyl salicylate, dimethylbenzylcarbinol, trichloromethylphenylcarbinyl acetate, p-tert-butylcyclohexyl acetate, isononyl acetate, vetiveryl acetate, vetiverol, α-hexylcinnamaldehyde, 2-methyl-3-(p-tert-butylphenyl)propanol, 2-methyl-3-(p-isopropylphenyl)propanal, 3-(p-tert-butylphenyl)propanal, tricyclodecenyl acetate, tricyclodecenyl propionate, 4-(4-hydroxy-4-methylpentyl)-3-cyclohexenecarbaldehyde, 4-(4-methyl-3-pentenyl)-3-cyclohexenecarbaldehyde, 4-acetoxy-3-pentyltetrahydropyran, methyl dihydrojasmonate 2-n-heptylcyclopentanone, 3-methyl-2-pentyl-2-cyclopentanone, decanal, dodecanal, 9-decen-1-ol, phenoxyethyl isobutyrate, phenylacetaldehyde dimethylacetal, phenylacetaldehyde diethylacetal, geranyl nitrile, citronellyl nitrile, cedryl acetate, 3-isocamphylcyclohexanol, cedryl methyl ether, isolongifolanone, aubepine nitrile, aubepine, heliotropin, coumarin, eugenol, vanillin, diphenyl oxide, hydroxycintronellal, ionones, methylionones, isomethylionones, irones, cis-3-hexenol and esters thereof, indan musk fragrances, tetralin musk fragrances, isochroman musk fragrances, macrocyclic ketones, macrolactone musk fragrances, ethylene brassylate, aromatic nitromusk fragrances.

Auxiliary substances and solvents which can be used in perfume compositions which contain compounds according to the invention are for example: ethanol, isopropanol, diethylene glycol monomethyl ether, dipropylene glycol, diethyl phthalate, triethyl citrate etc.

The quantities in which the compounds according to the invention can be used in perfume compositions or products to be perfumed may vary within wide limits and depend, inter alia, on the nature of the product in which the fragrance is used, on the nature and the quantity of the other components in the perfume composition and on the odour effect which is intended. For this reason it is possible to specify only very rough limits which, however, provide those skilled in the art with sufficient information to be able to use the compounds according to the invention independently. In most cases a quantity of only 0.1% by weight in a perfume composition will already be sufficient to obtain a clearly perceptible odiferous effect. On the other hand, to achieve special odiferous effects, it is possible to use quantities of 50% by weight or even more in a composition. In products perfumed by means of perfume compositions, these concentrations are proportionately lower, depending on the quantity of composition used in the product.

The examples below serve solely to illustrate the preparation and use of the compounds according to the invention. The invention is, however, not limited thereto.

EXAMPLE 1

Preparation of ethyl 6-isopropyl-2-methyl-3-cyclohexene-1-carboxylate (1a, R=ethyl, R$_2$=H)

A mixture of 70 g (0.61 mol) of trans-4-methyl-2-pentenoic acid and 49 g (0.72 mol) of 1,3-pentadiene was heated for 12 hours at approx. 200° C. in an autoclave.

After the reaction mixture had cooled, it was checked by means of GLC for the presence of 4-methyl-2-pentenoic acid. A further 25 g (0.36 mol) of 1,3-pentadiene were added, after which the mixture was again heated for 12 hours at 200° C. This procedure was repeated until no further decrease in the content of 4-methyl-2-pentenoic acid was any longer observed. The reaction mixture obtained was dissolved in 300 ml of ether and extracted with 300 ml of 10% NaOH solution. The alkaline solution thus obtained was acidified with 40 g of concentrated sulphuric acid and then extracted three times with ether. The ether extract was washed with water, dried on $MgSO_4$, evaporated down and distilled. 73 g of 6-isopropyl-2-methyl-3-cyclohexene-1-carboxylic acid were obtained, b.p.: 95°–100° C./70 Pa.

50 g (0.27 mol) of the abovementioned acid dissolved in 100 ml of dichloromethane were added in 45 min to a solution of 41 g (0.34 mol) of thionyl chloride in 100 ml of dichloromethane which was kept at 40° C. during this process. The mixture was then stirred for 4 hours under reflux, evaporated down and the evaporation residue distilled. 52 g of acid chloride were obtained, b.p.: 80° C./0.7 kPa.

The acid chloride thus obtained was added dropwise to 46 g of ethanol, the temperature being kept below 5° C. by cooling. The mixture was stirred for a further 30 min at this temperature, after which a solution of 0.26 mol of sodium ethylate in 100 ml of ethanol was added dropwise at the same temperature. The reaction mixture was then stirred for a further hour at room temperature, poured out into water and extracted 3 times with ether. The ether extract was washed once with water, dried on $MgSO_4$ and evaporated down. The evaporation residue was distilled, 54 g of the desired compound being obtained as a mixture of approx. 1 part of cis-trans isomer and 2 parts of trans-trans isomer, b.p.: 85° C./0.7 kPa.

The mixture of isomers was separated into the two components by fractionated distillation in a "spinning band" column.

Cis-trans-ethyl 6-isopropyl-2-methyl-3-cyclohexene-1-carboxylate: b.p.: 80° C./0.4 kPa; NMR (100 MHz, dissolved in $CCl_4$, δ in ppm with respect to TMS): 0.74 (3H, d, J=7 Hz); 0.8–1.0 (6H, d,d, J=7 Hz); 1.24 (3H, t, J=7 Hz); 1.5–2.1 (5H); 2.48 (1H, m); 4.08 (2H, k, J=7 Hz); 5.55 (2H). The comound has a fruity odour reminiscent of apple and somewhat rose-like with a woody note in the after-odour.

Trans-trans-ethyl 6-isopropyl-2-methyl-3-cyclohexene-1-carboxylate: b.p.: 75° C./0.4 kPa; NMR: 0.82 (3H, d, J=7 Hz); 0.92 (3H, d, J=7 Hz); 0.92 (3H, d, J=7 Hz); 1.25 (3H, t, J=7 Hz); 1.4–2.1 (5H); 2.43 (1H, m); 4.10 (2H, m); 5.36 (1H, d with fine structure, J=10 Hz); 5.60 (1H, d with fine structure, J=10 Hz).

The compound has a flowery odour reminiscent of rose and somewhat fruity, with spicy and balsamic notes in the after-odour.

EXAMPLE 2

Preparation of ethyl 2-isopropyl-6-methylcyclohexane-1-carboxylate (1b, R=ethyl, $R_2$=H)

0.5 g of 5% palladium on charcoal as a catalyst was added to 10.5 g of ethyl 6-isopropyl-2-methyl-3-cyclohexene-1-carboxylate (mixture of isomers obtained according to Example 1) dissolved in 100 ml of ethanol, after which the mixture was hydrogenated at 20° C. for 1 hour under a hydrogen pressure of 100 kPa. The catalyst was then filtered off, the filtrate evaporated down and the evaporation residue distilled. 9.4 g of the desired compound were obtained as a mixture of the cis-trans and the trans-trans isomer. b.p.: 96°–97° C./1 kPa; NMR (of the mixture): 0.7–1.0 (9H); 1.24 (3H, t); 1.0–2.5 (10H); 3.9–4.2 (2H).

The mixture of isomers has a fruity and somewhat rose-like odour with a woody note in the after-odour.

EXAMPLE 3

Preparation of ethyl 6-isopropyl-2-methylcyclohexadiene-1-carboxylate (1c, 1d and 1e, R=ethyl)

A mixture of 10.5 g (0.05 mol) of ethyl 6-isopropyl-2-methyl-3-cyclohexene-1-carboxylate (mixture of isomers obtained according to Example 1) and 9.8 g (0.055 mol) of N-bromosuccinimide dissolved in 75 ml of $CCl_4$ was stirred for 3 hours under reflux. After cooling the reaction mixture was filtered and the filter cake was washed with some cold $CCl_4$. The filtrate was evaporated down and the evaporation residue dissolved in 50 ml of dimethylformamide. 1.2 g of LiF and 3.4 g of $Li_2CO_3$ were added to this solution and the mixture was heated at 120° C. with continuous stirring for 1 hour. After cooling, 150 ml of water were added and the mixture was extracted 3 times with 50 ml of petroleum ether 40'-60. The extract was washed with water, dried and evaporated down, after which the residue was distilled. 8.1 g were obtained of a mixture, 60% of which consisted of the 2,4-cyclohexadiene isomer and the rest of the 1,3- and 2(exocyclic), 3-isomers of said compound. b.p.: 85°–88° C./0.6 kPa; NMR (data of the 2,4-isomer): 0.87 (3H, d, J=7 Hz); 0.90 (3H, d, J=7 Hz); 1.24 (3H, t, J=7 Hz); 1.6 (1H, m); 1.77 (3H, broad s); 2.54 (1H, m); 2.86 (1H, d, J=7 Hz); 4.07 (2H, k, J=7 Hz); 5.3–5.9 (3H).

The mixture of isomers has a spicy and fruity odour with flowery and woody notes.

EXAMPLE 4

Preparation of ethyl 2,4-dimethyl-6-isopropyl-3-cyclohexene-1-carboxylate (1a, R=ethyl, $R_2$=methyl)

A mixture of 82 g (1.0 mol) of 2-methyl-1,3-pentadiene and 92.3 g (0.65 mol) of ethyl trans-4-methyl-2-pentenoate was heated at 175°–185° C. in an autoclave for 6 hours. After cooling, the reaction mixture was distilled. 57 g were obtained of the desired compound as a mixture of approx. 60% cis-trans- and 40% trans-trans-isomer. b.p.: 90°–91° C./0.7 kPa, NMR (cis-trans-isomer): 0.75 (3H, d, J=7 Hz); 0.8–1.0 (6H, d.d., J=7 Hz); 1.25 (3H, t, J=7 Hz); 1.64 (3H, broad s); 1.5–2.6 (6H); 4.09 (2H, k, J=7 Hz); 5.30 (1H). NMR (trans-trans-isomer): 0.8–1.0 (9H, 3xd, J=7 Hz); 1.27 (3H, t, J=7 Hz); 1.64 (3H, broad s); 1.5–2.6 (6H); 4.13 (2H, m); 5.12 (1H).

The mixture has a spicy and woody odour reminiscent of juniper berries.

EXAMPLE 5

Preparation of ethyl 3-isopropyl-5-bicyclo[2.2.1]heptene-2-carboxylate (2a, R=ethyl)

A mixture of 75 g (0.53 mol) of ethyl trans-4-methyl-2-pentenoate and 40 g (0.30 mol) of cyclopentadiene dimer dissolved in 130 ml of benzene was heated for 6 hours at 175° C. in an autoclave. After cooling, the reaction mixture was evaporated down and the evaporation residue distilled. 50 g were obtained of the desired compound as a mixture of approx. 25% endo- and 75% exo-isomer; b.p.: 85°–87° C./0.6 kPa. The mixture has a fruity odour reminiscent of grapefruit with a spicy note and a woody note in the after-odour.

The mixture was separated into the two components by fractionated distillation in a "spinning band" column.

Endo ethyl 3-isopropyl-5-bicycloheptene-2-carboxylate: NMR: 0.7–1.0 (6H); 1.20 (3H, t, J=7 Hz); 2.40 (1H); 3.03 (1H); 3.99 (2H, k, J=7 Hz); 5.8–6.2 (2H).

Exo ethyl 3-isopropyl-5-bicycloheptene-2-carboxylate: NMR: 0.7–1.0 (6H); 1.24 (3H, t, J=7 Hz); 1.68 (2H); 1.95 (1H); 2.84 (2H); 4.07 (2H, k, J=7 Hz); 6.08 (2H).

EXAMPLE 6

Preparation of methyl 3-isopropyl-5-bicyclo[2.2.1]heptene-2-carboxylate (2a, R=methyl)

In the same manner as that described in Example 5, starting from 68 g of methyl 4-methyl-2-pentenoate and 40 g of cyclopentadiene dimer, 57 g were obtained of the desired compound as a mixture consisting of 25% endo- and 75% exo-isomer; b.p.: 81°–85° C./0.7 kPa. The mixture has a woody-spicy and flowery odour with green and minty notes.

EXAMPLE 7

Preparation of ethyl 3-isopropylbicyclo[2.2.1]heptane-2-carboxylate (2b, R=ethyl)

0.35 g of 5% palladium on charcoal as catalyst was added to 6.5 g of ethyl 3-isopropyl-5-bicycloheptene-2-carboxylate (mixture of isomers obtained according to Example 5) dissolved in 30 ml of ethanol, after which the mixture was hydrogenated at 20° C. for 1 hour under a hydrogen pressure of 100 kPa. The catalyst was then filtered off, the filtrate evaporated down and the evaporation residue distilled. 5.7 g were obtained of the desired compound as a mixture of endo- and exo-isomer. b.p.: 89° C./0.7 kPa; NMR (of the mixture): 0.7–1.0 (6H); 1.2 (3H, t); 1.0–2.5 (11H); 3.9–4.2 (2H).

The mixture has a fresh fruity and somewhat green odour with woody and slightly animal notes in the after-odour.

EXAMPLE 8

Preparation of ethyl 6-isopropyl-3-methyl- and 6-isopropyl-4-methyl-3-cyclohexene-1-carboxylate A mixture of 68 g (1 mol) of isoprene and 92.3 g (0.65 mol) of ethyl trans-4-methyl-2-pentenoate was heated at approx. 175° C. for 6 hours in an autoclave. A further 1 mol of isoprene was then added and heated for 6 hours, and this procedure was repeated a further time. The reaction mixture obtained was distilled after cooling. 52 g were obtained of a mixture of the two abovementioned compounds, approx. 55% of which consists of the 4-methyl isomer and 45% of the 3-methyl isomer. b.p.: 105° C./0.7 kPa; NMR (both isomers): 0.83 (3H, d, J=7 Hz); 0.93 (3H, d, J=7 Hz); 1.24 (3H, t, J=7 Hz); 1.64 (3H, broad s); 1.5–2.6 (7H); 4.10 (2H, m); 5.30 (1H).

The mixture has a fruity-flowery and woody odour with green and spicy notes.

EXAMPLE 9

Preparation of 3-methylbutyl 3-isopropyl-5-bicyclo[2.2.1]heptene-2-carboxylate (2a, R=3-methylbut-1-yl)

In the same manner as described in Example 5, starting from 60 g (0.33 mol) of 3-methylbut-1-yl trans-4-methyl-2-pentenoate and 25 g (0.185 mol) of cyclopentadiene dimer, 32 g were obtained of the desired compound as a mixture consisting of 35% endo- and 65% exo-isomer. b.p.: 82°–92° C./35 Pa. NMR (endo-isomer): 0.7–1.1 (12H); 2.40 (1H); 2.72 (1H); 3.05 (1H); 3.97 (2H, t, J=7 Hz); 5.8 –6.2 (2H). NMR (exo-isomer): 0.7–1.1 (12H); 1.95 (1H); 2.86 (2H); 4.05 (2H, t, J=7 Hz); 6.1 (2H).

The mixture has a woody-spicy and flowery odour with green and minty notes.

EXAMPLE 10

Preparation of allyl 3-isopropyl-5-bicyclo[2.2.1]heptene-2-carboxylate (2a, R=allyl)

In the same manner as that described in Example 1, the desired compound was obtained by first preparing 3-isopropyl-5-bicyclo[2.2.1]heptene-2-carboxylic acid (endoexo-mixture) starting from trans-4-methyl-2-pentenoic acid and cyclpentadiene dimer; b.p.: 105° C./70 Pa. The acid chloride was then prepared by means of thionyl chloride and 12 g (0.06 mol) thereof were converted into the desired ester with 4 g (0.07 mol) of allyl alcohol. 13 g were obtained of a mixture, 30% of which consisted of endo-isomer and 70% of exo-isomer. b.p.: 91°–93° C./0.5 kPa. NMR (endo-isomer): 0.7–1.0 (6H); 2.46 (1H); 2.70 (1H); 3.08 (1H); 4.4–4.6 (2H); 5.0–5.4 (2H); 5.6–6.1 (1H); 5.8–6.2 (2H). NMR (exo-isomer): 0.7–1.0 (6H); 1.98 (1H); 2.88 (2H); 4.4–4.6 (2H); 5.0–5.4 (2H); 5.6–6.1 (1H); 6.08 (2H).

The mixture has an odour resembling orange blossom with light minty notes.

EXAMPLE 11

Preparation of ethyl 3-isopropyl-methyl-5-bicyclo[2.2.1]heptene-2-carboxylate (3a, R=ethyl)

A mixture of 75 g (0.53 mol) of ethyl trans-4-methyl-2-pentenoate and 48 g (0.30 mol) of methylcyclopentadiene dimer dissolved in 130 ml of benzene was heated at 175° C. for 6 hours in an autoclave. After cooling, the reaction mixture was evaporated down and the evaporation residue distilled. 69 g were obtained of the desired compound as a mixture of the isomers 3a indicated in Reaction Scheme III. b.p.: 60°–65° C./13 Pa. NMR (of the mixture): 0.8–1.0 (6H); 1.2 (3H); 1.76 (3H, broad s); 4.0 (2H); 5.3–5.8 (1H).

The mixture has a fruity and flowery odour with spicy notes.

EXAMPLE 12

A rose perfume for use in shower and bath foam preparations was prepared according to the recipe below:

| | |
|---|---|
| 2-Phenylethanol | 459 parts by weight |
| Rose bath 002* | 150 parts by weight |
| Citronellol | 100 parts by weight |
| Geraniol | 100 parts by weight |

-continued

| | |
|---|---|
| α-Ionone | 20 parts by weight |
| Trichloromethylphenylcarbinyl acetate | 20 parts by weight |
| Dimethylbenzylcarbinyl acetate | 20 parts by weight |
| Linalool | 15 parts by weight |
| Benzyl acetate | 10 parts by weight |
| Clove oil | 5 parts by weight |
| 4-Methyl-2-(2-methylpropen-1-yl)-tetrahydropyran | 1 part by weight |
| Ethyl 6-isopropyl-2-methyl-3-cyclohexene-1-carboxylate (mixture of isomers obtained according to Example 1) | 100 parts by weight |
| Total: | 1,000 parts by weight |

*Perfume base marketed by Naarden International N.V.

EXAMPLE 13

A perfume composition of the fern type for use in aftershave lotion was prepared according to the following recipe:

| | |
|---|---|
| Lavandin oil | 245 parts by weight |
| Benzyl salicylate | 200 parts by weight |
| Dihydromyrcenol | 150 parts by weight |
| Patchouli oil | 100 parts by weight |
| Isolongifolanone | 100 parts by weight |
| Rosemary oil, French | 50 parts by weight |
| 5-Acetyl-3-isopropyl-1,1,2,6-tetramethylindan | 50 parts by weight |
| Ethyl 2,4-dihydroxy-3,6-dimethylbenzoate | 25 parts by weight |
| Armoise oil | 15 parts by weight |
| Geranium oil, Bourbon | 10 parts by weight |
| 2,4-Dimethylcyclohexene-3-carbaldehyde | 5 parts by weight |
| Ethyl 3-isopropylmethyl-5-bicyclo [2.2.1]heptene-2-carboxylate (mixture of isomers obtained according to Example 11) | 50 parts by weight |
| Total: | 1,000 parts by weight |

EXAMPLE 14

An aftershave lotion perfumed with the composition according to Example 9 was prepared according to the recipe below:

| | |
|---|---|
| A | 0.3 part by weight of 1-menthol |
| | 0.5 part by weight of Uvinol D 50[1] |
| | 30.2 parts by weight of propylene glycol |
| | 535 parts by weight of ethanol |
| B | 2.0 parts by weight of aluminium chlorohydrate allantoinate |
| | 2.0 parts by weight of lactic acid |
| | 400 parts by weight of distilled water |
| C | 20 parts by weight of perfume (Example 9) |
| | 10 parts by weight of Cremophor RH 40[2] |

[1]Trademark of BASF for 2,2',4,4'-tetrahydroxybenzophenone
[2]Trademark of BASF for a reaction product of hydrogenated castor oil and epoxy ethane.

The components mentioned under A, B and C were separately mixed to form the mixtures A, B and C. Mixture B was then added to mixture A while stirring thoroughly. Mixture C was then added and the total homogenized by stirring. In this way, a somewhat astringent aftershave lotion was obtained with a pleasant fern odour.

EXAMPLE 15

A perfume composition of the flowery-spicy type was prepared according to the recipe below:

| | |
|---|---|
| Isononyl acetate | 150 parts by weight |
| Diethyl malonate | 100 parts by weight |
| 2-Phenylethanol | 100 parts by weight |
| Methyl dihydrojasmonate | 100 parts by weight |
| β-Ionone | 50 parts by weight |
| Tricyclodecenyl acetate | 40 parts by weight |
| Benzyl acetate | 40 parts by weight |
| Orange oil, Florida | 40 parts by weight |
| 5-Phenyl-3-methylpentan-1-ol | 40 parts by weight |
| α-Amyl-cinnamaldehyde | 30 parts by weight |
| Terpinyl acetate | 30 parts by weight |
| 4-Acetoxy-3-pentyltetrahydropyran | 30 parts by weight |
| 2,6-Dimethylhepten-5-al[1] | 25 parts by weight |
| Ethyl pelargonate | 20 parts by weight |
| Nonadienal[2] | 20 parts by weight |
| Ethyl saffronate | 10 parts by weight |
| α-Damascone | 5 parts by weight |
| α-Allylionone | 5 parts by weight |
| Methyl nonen-2-oate | 5 parts by weight |
| Ethyl phenyl glycidate | 3 parts by weight |
| γ-Undecalactone | 2 parts by weight |
| γ-Decalactone | 1 part by weight |
| Ethyl 3-isopropyl-5-bicyclo-[2.2.1] heptene-2-carboxylate (mixture of isomers obtained according to Example 5) | 54 parts by weight |
| Total: | 900 parts by weight |

[1]10% solution in dipropylene glycol.
[2]0.5% solution in dipropylene glycol.

EXAMPLE 16

A perfume composition for a men's cologne was prepared according to the following recipe:

| | |
|---|---|
| Bergamot oil | 150 parts by weight |
| Cedryl acetate | 100 parts by weight |
| Methyl dihydrojasmonate | 100 parts by weight |
| Lavender oil French | 75 parts by weight |
| Acetyl cedrene | 50 parts by weight |
| Lavandin oil | 50 parts by weight |
| 5-Acetyl-3-isopropyl-1,1,2,6-tetramethylindan | 30 parts by weight |
| Rosemary oil Spanish | 30 parts by weight |
| Benzyl salicylate | 25 parts by weight |
| 11-Oxahexadecanolide | 20 parts by weight |
| Coumarin | 15 parts by weight |
| Orange oil Florida | 15 parts by weight |
| Patchouli oil | 10 parts by weight |
| Eugenol | 10 parts by weight |
| Petitgrain oil | 10 parts by weight |
| 3-Isocamphylcyclohexanol | 10 parts by weight |
| Mousse de chene absolute | 10 parts by weight |
| Geranium oil | 10 parts by weight |
| Coriander oil | 10 parts by weight |
| Labdanum absolute | 5 parts by weight |
| Pimento berry oil | 5 parts by weight |
| Clary sage oil | 5 parts by weight |
| Cardamom oil | 3 parts by weight |
| 3-(p-tert-butylphenyl)-2-methylpropanol | 2 parts by weight |
| Ethyl 2,4-dimethyl-6-isopropyl-cyclohex-3-encarboxylate (mixture of isomers obtained according to Example 4) | 50 parts by weight |
| Total: | 800 parts by weight |

We claim:
1. A perfume composition comprising an effective odorant amount of at least one compound having the formula 1

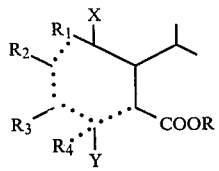

wherein

X and Y each represent a hydrogen atom or X and Y together represent a methylene bridge, R represents an alkyl, alkenyl or cycloalkyl group containing 1-6 carbon atoms, and $R_1$-$R_4$ each represent a hydrogen atom or a methyl group, with the proviso that if X and Y each represent a hydrogen atom, the following cases apply:

if $R_1$ represents a methyl group, $R_4$ represents a methyl group and $R_2$ and $R_3$ represent a hydrogen atom;

if $R_3$ represents a methyl group, $R_1$ and $R_4$ both represent a hydrogen atom; and if neither $R_1$ nor $R_3$ represents a methyl group, $R_2$ and $R_4$ both represent, or one of the two represents, or neither of the two represents, a methyl group; and if X and Y together represent a methylene bridge, at most one of the symbols $R_1$-$R_4$ represents a methyl group;

the double dotted line represents a single or a double bond, in which case if X and Y and also $R_1$-$R_3$ represent a hydrogen atom and $R_4$ represents a methyl group, the double dotted line together with a single dotted line, or two single dotted lines, may together represent a pair of conjugated double bonds, and if X and Y and also $R_1$-$R_3$ represent a hydrogen atom, $R_4$ may also represent a methylene group, in which case the double dotted line together with the dotted line directed towards $R_4$ represent a pair of conjugated double bonds.

2. A perfume composition according to claim 1 comprising an effective odorant amount of at least one of the compounds having the formula 1a

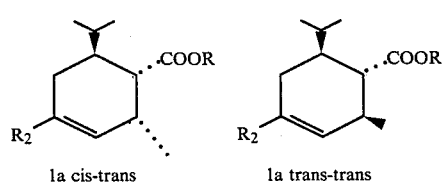

1a cis-trans      1a trans-trans wherein R represents an alkyl group containing 1-3 carbon atoms and $R_2$ represents a hydrogen atom.

3. A perfume composition according to claim 1 comprising an effective odorant amount of at least one of the compounds having the formula 1a

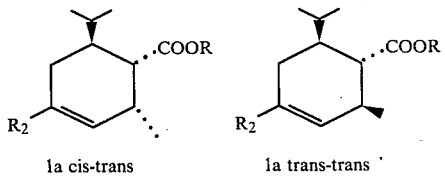

1a cis-trans      1a trans-trans wherein R represents an alkyl group containing 1-3 carbon atoms and $R_2$ represents a methyl group.

4. A perfume composition according to claim 1 comprising an effective odorant amount of at least one of the compounds having the formula 2a

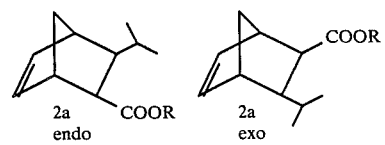

2a endo      2a exo wherein R represents an alkyl group containing 1-3 carbon atoms.

5. A perfume composition according to claim 1 comprising at least 0.1% by weight of at least one of the compounds defined in claim 1.

6. A perfumed product comprising an effective odorant amount of at least one compound having the formula 1

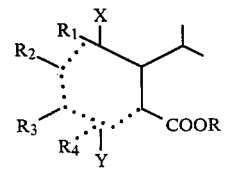

wherein

X and Y each represent a hydrogen atom or X and Y together represent a methylene bridge, R represents an alkyl, alkenyl or cycloalkyl group containing 1-6 carbon atoms, and $R_1$-$R_4$ each represent a hydrogen atom or a methyl group, with the proviso that if X and Y each represent a hydrogen atom, the following cases apply:

if $R_1$ represents a methyl group, $R_4$ represents a methyl group and $R_2$ and $R_3$ represent a hydrogen atom;

if $R_3$ represents a methyl group, $R_1$ and $R_4$ both represent a hydrogen atom; and if neither $R_1$ nor $R_3$ represents a methyl group, $R_2$ and $R_4$ both represent, or one of the two represents, or neither of the two represents, a methyl group; and if X and Y together represent a methylene bridge, at most one of the symbols $R_1$-$R_4$ represents a methyl group;

the double dotted line represents a single or a double bond, in which case if X and Y and also $R_1$-$R_3$ represent a hydrogen atom and $R_4$ represents a methyl group, the double dotted line together with a single dotted line, or two single dotted lines, may together represent a pair of conjugated double bonds, and if X and Y and also $R_1$-$R_3$ represent a hydrogen atom, $R_4$ may also represent a methylene group, in which case the double dotted line together with the dotted line directed towards $R_4$ represent a pair of conjugated double bonds.

7. A perfumed product according to claim 6 comprising an effective odorant amount of at least one of the compounds having the formula 1a

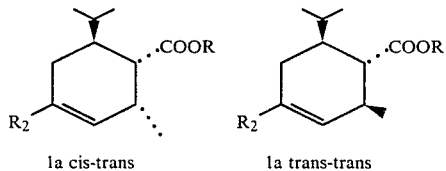

la cis-trans    la trans-trans wherein R represents an alkyl group containing 1-3 carbon atoms and $R_2$ represents a hydrogen atom.

8. A perfumed product according to claim 6 comprising an effective odorant amount of at least one of the compounds having the formula 1a

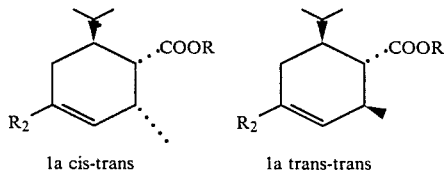

la cis-trans    la trans-trans wherein R represents an alkyl group having 1-3 carbon atoms and $R_2$ represents a methyl group.

9. A perfumed product according to claim 6 comprising an effective odorant amount of at least one of the components having the formula 2a

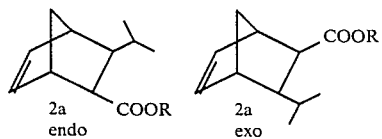

2a endo    2a exo wherein R represents an alkyl group containing 1-3 carbon atoms.

10. Compounds having the formula 1

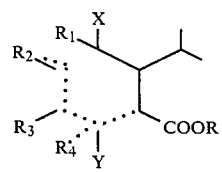

wherein

X and Y each represent a hydrogen atom or X and Y together represent a methylene bridge, R represents an alkyl, alkenyl or cycloalkyl group containing 1-6 carbon atoms, and $R_1$-$R_4$ each represent a hydrogen atom or a methyl group, with the proviso that if X and Y each represent a hydrogen atom, the following cases apply:
  if $R_1$ represents a methyl group, $R_4$ represents a methyl group and $R_2$ and $R_3$ represent a hydrogen atom;
  if $R_3$ represents a methyl group, $R_1$ and $R_4$ both represent a hydrogen atom; and
  if neither $R_1$ nor $R_3$ represents a methyl group, $R_2$ and $R_4$ both represent, or one of the two represents, or neither of the two represents, a methyl group; and if X and Y together represent a methylene bridge, at most one of the symbols $R_1$-$R_4$ represents a methyl group;

the double dotted line represents a single or a double bond, in which case if X and Y and also $R_1$-$R_3$ represent a hydrogen atom and $R_4$ represents a methyl group, the double dotted line together with a single dotted line, or two single dotted lines, may together represent a pair of conjugated double bonds, and if X and Y and also $R_1$-$R_3$ represent a hydrogen atom, $R_4$ may also represent a methylene group, in which case the double dotted line together with the dotted line directed towards $R_4$ represent a pair of conjugated double bonds.

11. Compounds having the formula 1a

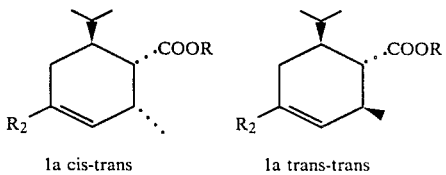

la cis-trans    la trans-trans wherein R represents an alkyl group containing 1-3 carbon atoms and $R_2$ represents a hydrogen atom.

12. Compounds having the formula 1a

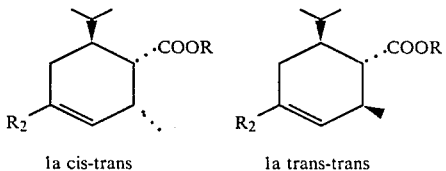

la cis-trans    la trans-trans wherein R represents an alkyl group containing 1-3 carbon atoms and $R_2$ represents a methyl group.

13. Compounds having the formula 2a

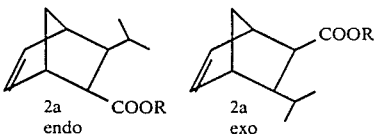

2a endo    2a exo wherein R represents an alkyl group containing 1-3 carbon atoms.

* * * * *

UNITED STATES PATENT AND TRADEMARK OFFICE
CERTIFICATE OF CORRECTION

PATENT NO. : 4,843,061

DATED : June 27, 1989

INVENTOR(S) : Broekhof et al.

It is certified that error appears in the above-identified patent and that said Letters Patent is hereby corrected as shown below:

Title page, Item 73, "The Hague" should read --Naarden-Bussum--
Title page, line 3 of Item 54, AND col. 1, line 3, "(2.2.1)" should read --[2.2.1] heptane and bicyclo [2.2.1]--
Title page, penultimate line of ABSTRACT, "wood" should read --woody--;

Col. 1, line 30, " 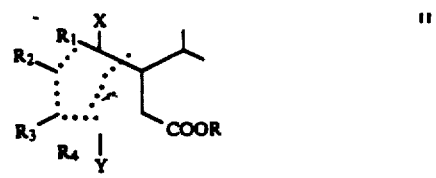 "

should read -- 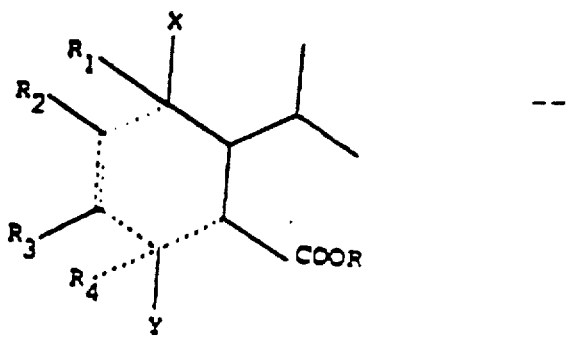 --

Col. 1, line 38, "represents" should read --represent--;

UNITED STATES PATENT AND TRADEMARK OFFICE
CERTIFICATE OF CORRECTION

PATENT NO. : 4,843,061

DATED : June 27, 1989

INVENTOR(S) : Broekhof et al.

It is certified that error appears in the above-identified patent and that said Letters Patent is hereby corrected as shown below:

Middle of Col. 4, " 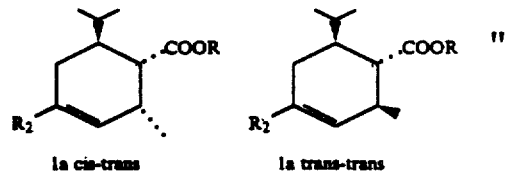 "

should read -- 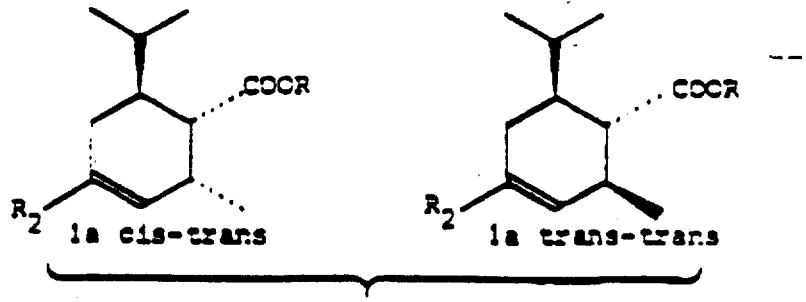 --

Col. 5, line 28, "enso/exo" should read --endo/exo--;
Col. 10, line 28, "cyclpentadiene' should read --cyclopentadiene--;
Col. 10, line 67, "Rose bath" should read --Rose base--;

UNITED STATES PATENT AND TRADEMARK OFFICE
CERTIFICATE OF CORRECTION

PATENT NO. : 4,843,061

DATED : June 27, 1989

INVENTOR(S) : Broekhof et al.

It is certified that error appears in the above-identified patent and that said Letters Patent is hereby corrected as shown below:

Col. 15, line 55, " 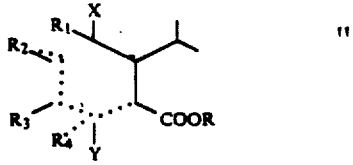 "

should read -- 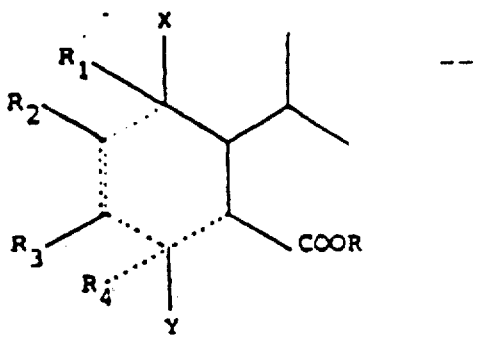 --

Signed and Sealed this

Seventh Day of August, 1990

Attest:

HARRY F. MANBECK, JR.

*Attesting Officer*     *Commissioner of Patents and Trademarks*